Jan. 23, 1968
T. C. DONALDSON ET AL
3,364,604
VISUAL AID TEACHING DEVICE
Filed June 20, 1966
2 Sheets-Sheet 2
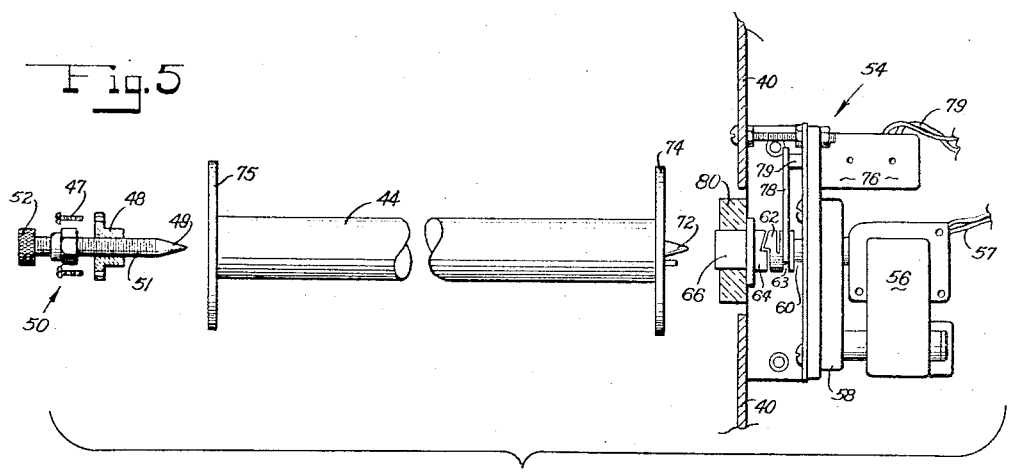
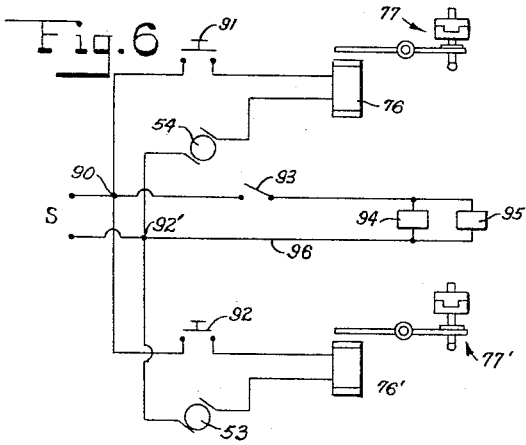
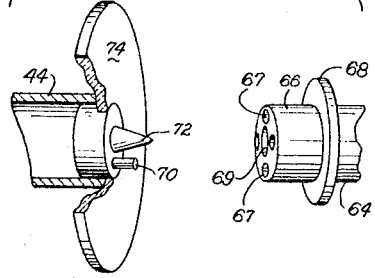
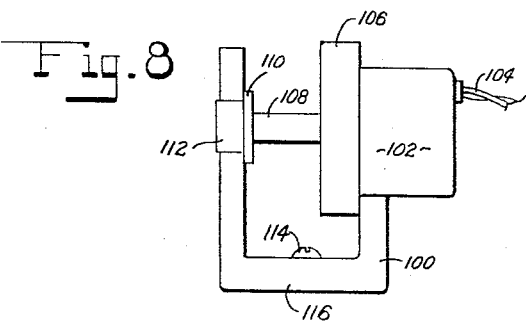
INVENTORS:
Tommie C. Donaldson
and
John W. Worthy
BY
Marcus L. Bates United States Patent Office 3,364,604
Patented Jan. 23, 1968

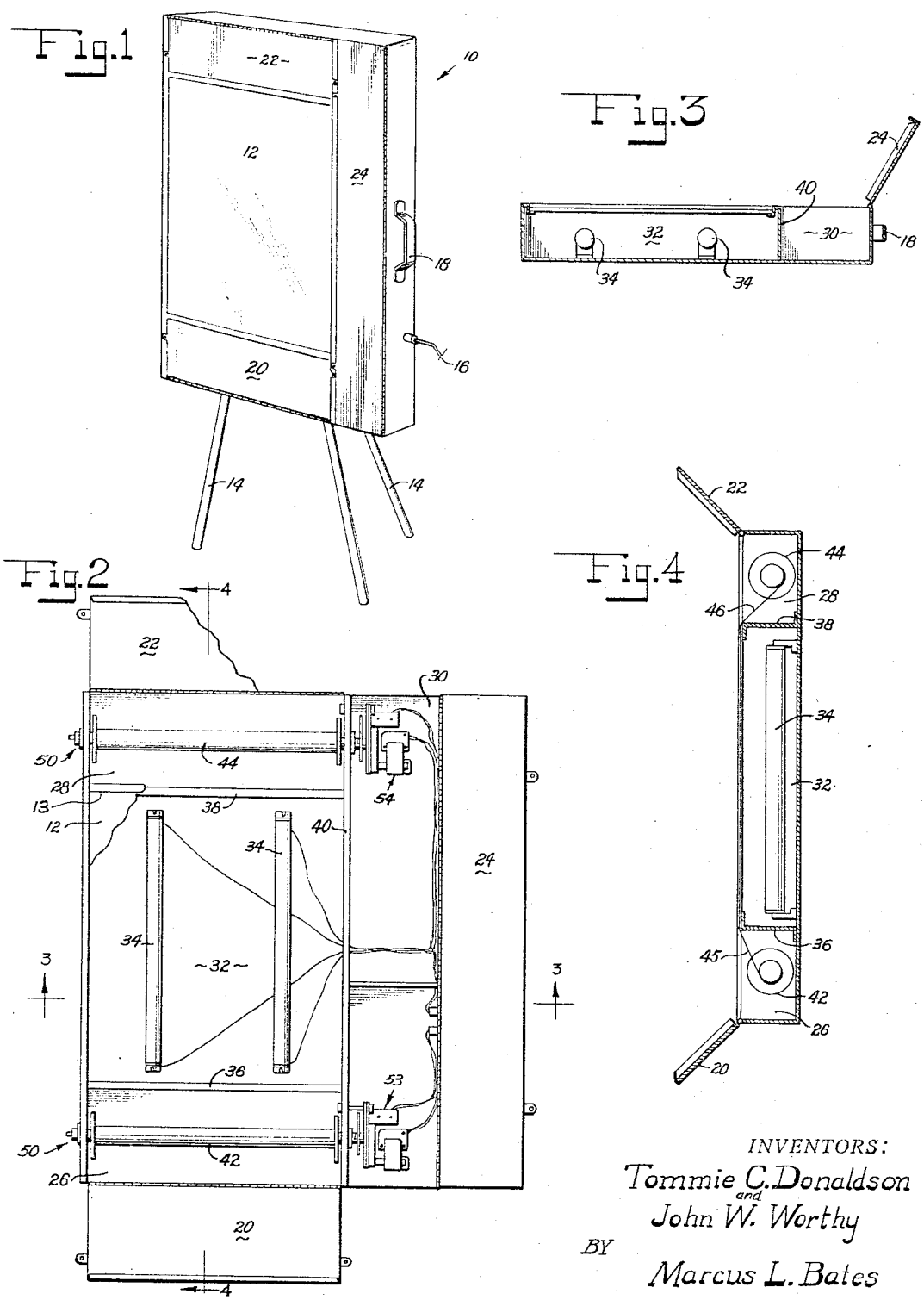

3,364,604
VISUAL AID TEACHING DEVICE
Tommie C. Donaldson and John W. Worthy, both of Odessa, Tex.; said Worthy assignor to Quinton M. Locke, Odessa, Tex.
Continuation-in-part of application Ser. No. 496,421, Oct. 15, 1965. This application June 20, 1966, Ser. No. 558,895
4 Claims. (Cl. 40—31)

ABSTRACT OF THE DISCLOSURE

A portable visual aid teaching device in the form of a cabinet having a centrally located illuminating compartment, a drive compartment, and upper and lower roll compartments. An elongated sheet of web material is wound about each roll and each roll is received within the upper and lower compartments. Drive means located in the drive compartment are attached to each roll in a manner to enable the web to travel across the illuminating compartment in either direction of travel in accordance with energization of the power drive means. The illuminating means are contained behind the web so as to enable indicia contained upon the web to be easily viewed from a considerable distance. Each drive means includes a solenoid actuated clutch means and circuit means associated therewith to selectively advance or rewind the web onto the rolls.

---

This invention is a continuation in part of patent application Ser. No. 496,421, filed Oct. 15, 1965, and now abandoned, entitled, "Roll Material Viewing Apparatus."

The present invention relates to a visual aid teaching device which comprises a viewing apparatus that facilitates the scanning of a portion of an elongated sheet material so as to enable the viewer thereof to observe the data thereon in an orderly and controlled sequence, wherein knowledge may be placed or stored upon a roll and thereafter viewed in a novel manner.

The present novel viewing device encompasses a unitary device of a generally retangular configuration having an enlarged lighted portion upon a major surface thereof so as to enable an observer to scan a generous amount of material at a glance, and furthermore, has provided therein dual rolls located at the top and bottom extremity thereof upon which the material may be conveniently stored within the structure of the apparatus. A novel drive means is associated with each roll so as to enable the operator thereof to place any desired portion of the stored data where it may be viewed by a large audience. The apparatus is furthermore provided with a remote control means by which the device may be actuated at a distance therefrom so as to enable the operator to selectively place any desired portion of the stored knowledge upon the viewing portion of the apparatus.

The principal object of the present invention is to provide a novel viewing apparatus that is attractive in appearance, easily transportable, of rigid construction, and simple to fabricate.

Another object of this invention is to provide a remotely controlled viewing apparatus that will enable the operator thereof to controllably position any portion of the stored knowledge that is contained therein before a large audience so as to enable viewing thereof by a multiplicity of persons.

A still further object of this invention is to provide a scanning device capable of being selectively manipulated by remote control power means for effecting travel of data contained upon a sheet material across a transparent inspection station having illuminating means associated therewith, whereby the sheet material may be caused to move a predetermined amount across the inspection station in accordance with the desires of the operator.

An additional object of this invention is to provide a novel viewing apparatus having an elongated sheet of material placed upon dual rolls that are spaced apart by a scanning station and wherein a novel drive train is associated with each roll and provided with circuitry that lends itself to be remotely controlled so as to positively cause the sheet material to advance or reverse in its travel across the viewing station.

Although the features of this invention which are believed to be novel are set forth in the appended claims, the details of the preferred embodiment and further objects and advantages may be comprehended through reference to the following description taken in connection with the accompanying drawings, wherein:

FIGURE 1 is a perspective view of the novel viewing apparatus;

FIGURE 2 is a plan view of the apparatus shown in FIGURE 1 with the doors thereof open to illustrate the interior thereof, and with portions broken away to better illustrate the device;

FIGURE 3 is a cross sectional view taken along lines 3—3 of FIGURE 2;

FIGURE 4 is a cross sectional view taken along lines 4—4 of FIGURE 2;

FIGURE 5 is an enlarged detail of a portion of the apparatus illustrated in FIGURE 2, with some parts shown in section;

FIGURE 6 is a schematical representation of the circuitry employed in the instant novel device;

FIGURE 7 is a perspective view of parts of the device illustrated in FIGURES 2 and 5 with some parts broken away and some parts shown in section for clarity; and, FIGURE 8 is a plan view of a modification of the drive mechanism such as seen in FIGURE 5.

The arrangement for carrying out this invention which is portrayed in the various figures is generally illustrated in FIGURE 1 wherein there is seen the viewing apparatus, generally indicated by the numeral 10, conveniently mounted upon a tripod 14 and adapted to be placed at the front of a class room or the like. As seen in FIGURE 1, the apparatus is provided with a carrying handle 18 conveniently located at one side thereof, an upper hinged panel 22, lower hinged panel 20, and side hinged panel 24. Leading from the side and below the handle 18 is a remote control multi-conductor 16 that may extend a suitable distance to a hand-held switch arrangement so as to enable the operator thereof to stand adjacent one of the viewers and accordingly discuss the particularities of the material that is selectively and controllably passed across the viewing station 12 by the before mentioned remote control switch means attached to conductor 16.

Looking now to FIGURE 2, in conjunction with the remaining figures wherein the viewing apparatus is shown with the beforementioned hinged panels in open position so as to illustrate the interior thereof, there is seen located within the rigid rectangular box-like viewing apparatus 10, a lower roller 42 suitably journaled at each extremity thereof, and upper roller 44 that is likewise suitably journaled at each extremity thereof. The panels 20, 22, 24 are provided with hinges, as illustrated, attached to the main body portion of the viewing apparatus. Flanged portions 36, 38, 40 are rigidly attached to the main body portion so as to form a unitized rectangular body having compartments 26, 32, 28, and 30 therein. Lower and upper compartments 26 and 28 respectively provide a compartment within which the lower and upper rolls 42, 44 respectively are conveniently and rotatably housed. The central compartment 32 is provided with suitable illuminating means, such as the fluorescent light bulbs illustrated by the numerals 34, although other suitable illuminating means may be employed if desired. Compartment 30 houses motor drive assemblies or mechanisms 53 and 54 in addition to the transformer (not shown) for the beforementioned fluorescent light bulbs. The transparent or translucent flat sheet of material, preferably a plastic such as Plexiglas, forms the viewing station 12, and is advantageously mounted on the flanged portions of the bulkheads forming enclosure 32 as is amply illustrated in FIGURES 2 and 4.

The web or sheet material 45, 46 is preferably loaded or wound onto lower roll 42 and then placed in lower chamber 26 whereupon the sheet material is then brought outwardly and up over illuminated station 12 and L-shaped guide members 13 located at each extremity of station 12. The end of the sheet material is attached to upper roll 44 by a clip fastened to the center of the free end of the sheet material which is secured to an aperture centrally located in roll 44 so as to permit the sheet to inherently center itself upon the roll 44 in a manner that will enable the roll 44 to rotate while winding the sheet material 45, 46 upon roll 44 in an aligned manner until a desired amount of the sheet material has passed from roll 42, across the viewing station, and onto the roll 44.

Looking now to the details of FIGURE 5 wherein the journaled ends of the roll 44 and the drive mechanism 54 are more fully shown. Since assembly or mechanisms 53 and 54 are identical, for all practical purposes, only the upper drive mechanism 54 will be discussed in detail. As seen in FIGURE 5 taken in conjunction with FIGURE 7, the roll 44 is comprised of an elongated tubular stock of material, preferably of reinforced cardboard or the like, having flanges 74, 75 at each extremity thereof. Flanges 74, 75 are preferably built up of reinforced Fiberglas and plastic resin composition and molded together with the alignment means placed therein so as to form an integral rigid roll structure. The flange 74 is preferably built up of glass fibers and resin that is cast integrally with the illustrated thimble from which tapered protuberance 72 and drive pin 70 extend. Tapered protuberance 72 is received within a similarly oppositely tapered aperture 69 and drive pin 70 is received within one of the apertures 67 of the clutch mechanism 66. A flange 68 is machined onto clutch portion 66 leaving a second portion 64. The face of portion 64 is suitably machined so as to form a ratchet that is engageable with the similarly machined clutch portion 62. Clutch portion 62 is movably splined onto shaft 60 and is provided with a circumferential groove 63 about the outer periphery thereof, as illustrated in FIGURE 5, which provides a means by which yoke 78 may be engaged therewith to thereby effect longitudinal movement between clutch portion 62 and shaft 60 when the armature 79 of solenoid 76 is actuated. Armature 79 is normally spring biased into the extended or engaging position, and when the solenoid 76 is energized, the armature 79 is retracted into the solenoid 76 whereupon yoke 78 moves clutch portion 62 out of engagement with the ratchet of clutch face 64 thereby disengaging motor 56 from the roll 44.

Flange 75 is likewise built up of epoxy resin and glass fibers and provided with a central metallic aperture that receives retractable centering screw portion 49 therein. The centering portion 49 of the screw assembly indicated generally by the numeral 50, includes a threaded bolt, indicated by numeral 51, that is threadedly received within the mount means 48 and is further provided with a knurled finger adjustment means at 52 and a lock-nut. Screws 47 maintain mount means 48 rigidly attached to the side of the viewing apparatus as indicated generally at 50 in FIGURE 2. Hence, it may now be seen by those skilled in the art, that the tapered screw portion 49 in conjunction with the centrally located and similarly tapered centrally located aperture of flange 75, and the tapered means 72 that is received by similarly tapered aperture 69, maintain the rotatable roll 44 journaled in proper alignment with the remaining structure.

Looking now to the details of the circuit illustrated in FIGURE 6, there is seen therein two series and one parallel circuit that are connected to a suitable source of power indicated by the letter S. Following the first circuit from 90 there is seen a normally open switch 91 series connected to solenoid 76 which in turn is series connected to the motor of drive mechanism 54, which is suitably connected so as to complete the circuit to the source S at 92′. The second series circuit, beginning at 90, is provided with a normally open switch 92 series connected to solenoid 76′ which in turn is connected to the motor of drive mechanism 53, which is connected to the source at 92′. The two switches 91, 92 are both mounted within a suitable hand held box-like container and provided with suitable electrical conduits as at 16 in FIGURE 1 so as to enable the operator of the viewing apparatus to stand at a substantial distance from the viewing apparatus as determined by the length of the conductor at 16.

Hence, it may now be seen that the first and second above described series circuits are identical to each other. The clutch mechanism of FIGURE 5 is indicated generally by numeral 77 and 77′ in the schematical representation thereof in FIGURE 6. Included in the circuit and connected to source S are illuminating circuits 94, 95 which represent the power transformers, starters, and the like necessary for the proper operation of the two fluorescent bulbs 34 of FIGURE 2, the details of which are well known in the art. The illuminating circuit includes a switch 93 series connected with the two parallel connected transformers of circuits 94 and 95.

Looking back to the details of FIGURE 2 in conjunction with FIGURE 6, it should be understood that the motor of the drive assembly or mechanism 54 is series connected with the solenoid of the drive mechanism 53 so that when the motor of drive mechanism 54 is actuated, the adjacent solenoid thereof remains in the unenergized and engaged position while the series connected solenoid of the second drive assembly 53 is energized thereby leaving the clutch of drive assembly 54 in the normally engaged position, while disengaging the clutch of the drive assembly 53, to thereby permit the sheet of viewing material to be rolled onto roll 44 while the roll 42 is being unrolled, and since drive assembly 53 has the solenoid thereof energized and thus in the disengaged position, the journaled mount means at each extremity of roll 42 will provide sufficient friction to maintain the sheet material taut between the two rolls. When it is desired to reverse the direction of travel of the sheet material 45, 46, the opposite or remaining button in the before mentioned hand held conventional switch assembly is pressed, whereupon the motor of drive assembly 53 and the solenoid of the drive assembly 54 is then energized whereby the roll 42 will then rotate and accordingly cause the material to be wound upon its outer periphery; and the roll 44, since its solenoid is actuated and thus its attendant clutch is disengaged, will offer sufficient resistance to maintain the sheet of material sufficiently taut, as in the same before described manner of operation of drive assembly 53.

FIGURE 8 shows a modification of the two drive assemblies 53, 54 of FIGURE 2. As seen in FIGURE 8, the drive assembly has a motor 102 energized by conductors 104 and is attached to upstanding portion 100 of frame 116. Screw 114 maintains the frame 116 rigidly attached to the bottom of compartment 30 so as to maintain the geared shaft 108 aligned with drive member 112 which in turn is aligned with the roll 44 or 42. Numeral 106 indicates a reduction gear box that operatively connects geared shaft 108 to motor 102. A fluid drive mechanism may alternatively be used in conjunction with or in lieu of the gear box 106. The drive means 112 is provided with a central tapered aperture that receives the tapered protuberance 72 of the roll, and is further provided with apertures such as seen at 67 that receives the drive pin 70 of the roll as previously described above in conjunction with FIGURE 7.

In operation, the cabinet 10 is provided with an empty roll 44 and a roll 42 upon which has been wound the elongated sheet or web of material to be viewed. The sheet of material is of a length dictated by the amount of data contained thereon and is threaded over the transparent plate of viewing station 12 as indicated at numeral 45 and under the roll 44 as indicated by numeral 46 of FIGURE 4. The material is advanced in an upward direction by depressing switch 91 which energizes the motor of the drive assembly 54 while at the same time disengaging the clutch of drive assembly 53. Immediately upon release of switch 91, the movement of the material across the viewing station will stop to thereby enable that portion of material visible on the illuminated viewing portion station 12 to be studied. When it is desired to continue with additional and perhaps unviewed material, the switch button 91 is again depressed thereby moving new subject matter from roll 42, across the viewing station, and subsequently onto roll 44; whereupon the button may again be released if it is desired to maintain the subject matter presented by the screen 12 in view for a period of time. By depressing the opposite or remaining second switch 92, the lower motor of the drive assembly 53 will be energized along with the solenoid of drive assembly 54 and accordingly, the material will move across the viewing station 12 in a reverse manner. Hence, it should be readily apparent that the material may be advanced, reversed, or stopped as desired by the operator by simply depressing one of the two remote control switches.

While a particular embodiment of this invention has been shown and described herein, it will occur to those skilled in the art that various changes and modifications can be accomplished without departing either in spirit or scope from the invention as set forth in the appended claims, therefore, what we claim as new and desire to secure by Letters Patent of the United States is:

1. A visual aid teaching device comprising a cabinet having upper, lower, and side walls and a rear wall;
   a flanged bulkhead extending vertically from said lower to said upper wall and defining a motor drive compartment;
   spaced apart flanged bulkheads extending from said vertical flanged bulkhead to one of said side walls in a direction away from said drive compartment and defining a lower and upper roll compartment with an illuminating compartment therebetween;
   said lower, upper, and motor drive compartments being provided with closure members in the form of panels;
   said panels each including a hinge along one edge thereof attaching said panels to one edge of said lower, upper, and side wall respectively;
   horizontally aligned journaled means in said lower and upper roll compartments adapted to rotatably receive a roll therebetween and within each said roll compartment;
   lower and upper power drive means mounted in said motor drive compartments and operatively aligned with said lower and upper rollers respectively;
   said lower and upper drive means including lower and upper clutch means interconnecting said lower and upper rolls to a lower and upper motor;
   a solenoid means operatively associated with each clutch of each motor and roll to engage and disengage each said motor from its respective roll;
   said solenoid normally maintaining said clutch in the disengaged position;
   two normally open switches located a remote distance from said cabinet;
   circuit means series connecting one of said switches, said upper motor, and said lower solenoid to a common source;
   second circuit means connecting a second of said switches in series with said lower motor and said upper solenoid and to said common supply;
   an elongated sheet of web material wound about each said roll and extending therebetween and across said illuminating compartment, whereby;
   actuation of said lower power drive means causes said web to travel across said illuminating compartment in one direction and actuation of said upper power drive means causes said web to travel across said illuminating compartment in an opposite direction.

2. The device of claim 1 wherein said illuminating compartment is provided with illuminating means;
   a sheet of transparent material covering said illuminating compartment and having the edge portions thereof superimposed on and supported by said flange of said bulkheads;
   said sheet of web material adapted to travel across said transparent material in slidable relationship thereto, whereby;
   said illuminating means provides said web with a rearward light source to thereby enhance the visual observance of the web.

3. The device of claim 2 wherein an L-shaped guide member is provided at the upper and lower edge portion of the sheet of transparent material, said L-shaped guide member being adapted to extend horizontally and coextensively with said flanged lower and upper bulkheads, whereby;
   said web rides across said L-shaped guide members during its travel across said illuminated compartment.

4. The device of claim 1, wherein each said roll is comprised of an elongated tubular member having a vertical flanged surface at each extremity;
   one flanged surface of each roll having a centrally located tapered aperture adapted to mate with a similar tapered threaded protuberance adjustably mounted so as to provide one of the beforementioned journaled means in the side opposite said drive compartment;
   the remaining flanged surface of each roll having a centrally located depending tapered protuberance and a power drive pin located a spaced distance therefrom;
   said tapered aperture and said protuberance being cast integrally with each respective said flanged surface to thereby provide an integral flanged roller assembly of the type described;
   said power drive means including a motor driven clutch means having an element rotatably mounted adjacent said remaining flanged surface and adapted to impart rotatable motion to said pin and to rotatably receive said tapered protuberance, whereby;
   energization of one of said power drive means causes the adjacent roll to rotate and move the web onto the roll associated therewith.

References Cited

UNITED STATES PATENTS

| 396,019 | 1/1889 | Angel | 40—86 |
| 1,265,071 | 5/1918 | Flint | 40—86 |
| 1,971,263 | 8/1934 | Hullinger | 40—86 |
| 2,483,570 | 10/1949 | Bergey | 40—31 XR |

FOREIGN PATENTS 25,598   12/1936   Australia.

EUGENE R. CAPOZIO, *Primary Examiner.*

WILLIAM GRIEB, *Examiner.*